Dec. 21, 1926.
R. G. MOORE
1,611,549
HANDLE STRUCTURE
Filed April 17, 1926    2 Sheets-Sheet 1
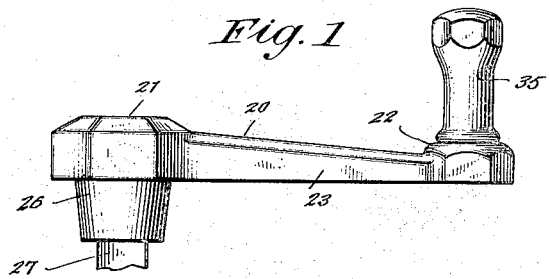
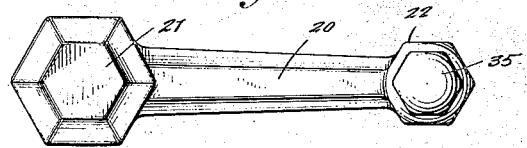
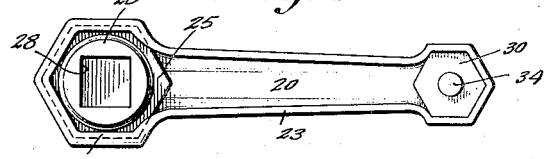
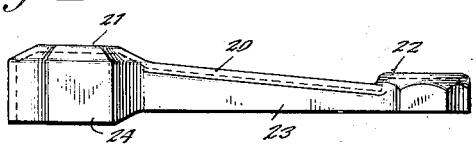
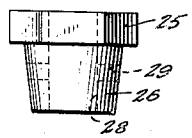
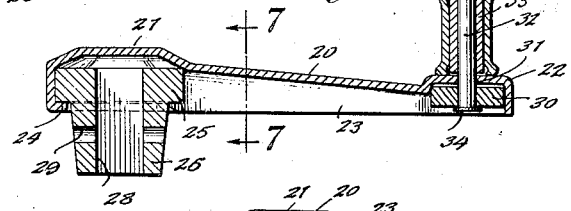
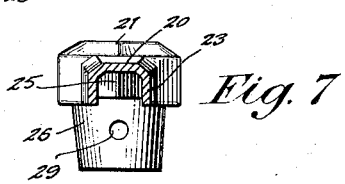
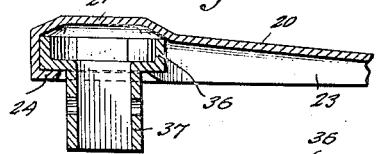
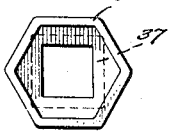
INVENTOR.
Raymond G. Moore
BY
ATTORNEY Dec. 21, 1926.  1,611,549
R. G. MOORE
HANDLE STRUCTURE
Filed April 17, 1926   2 Sheets-Sheet 2
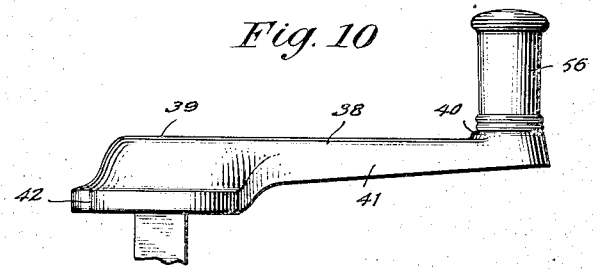
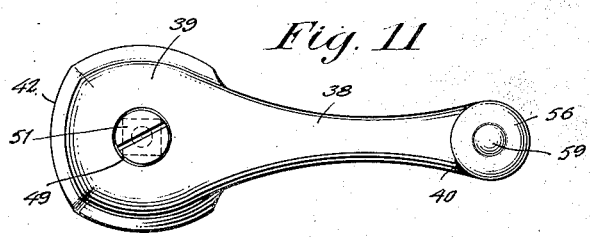
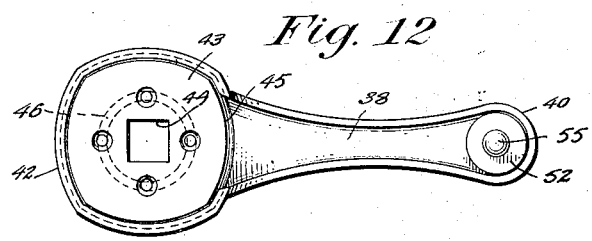
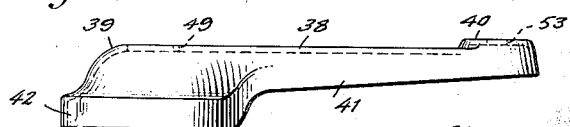
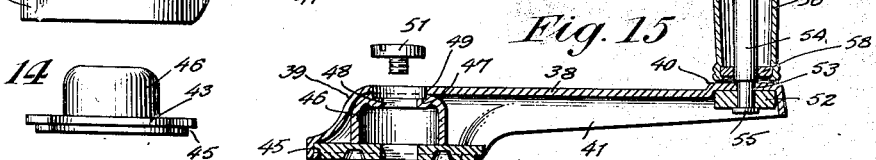
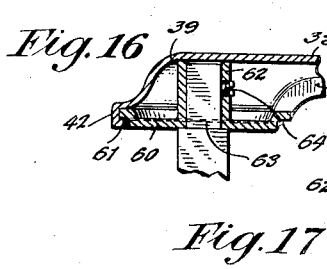
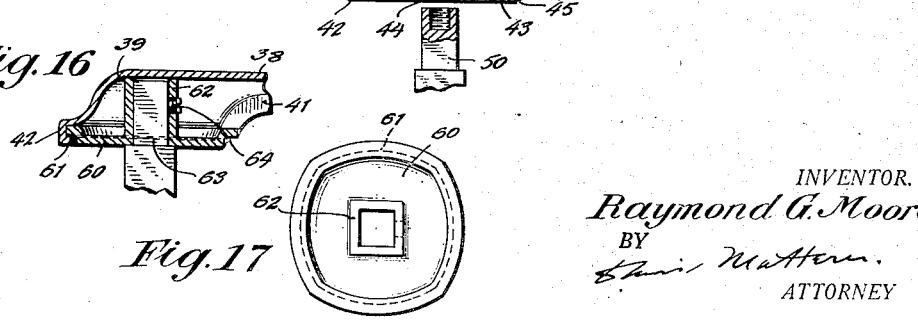
INVENTOR.
Raymond G. Moore
BY
ATTORNEY Patented Dec. 21, 1926.

1,611,549

UNITED STATES PATENT OFFICE.

RAYMOND G. MOORE, OF BRIDGEPORT, CONNECTICUT, ASSIGNOR TO THE BASSICK COMPANY, A CORPORATION OF CONNECTICUT.

HANDLE STRUCTURE.

Application filed April 17, 1926. Serial No. 102,796.

The present invention relates to an improved handle structure, particularly of the type adapted for use as a regulator handle for automobile windows, although the invention is applicable to other types of handles.

Heretofore handles of this type have usually been formed of cast metal, which was both expensive and unsatisfactory in many respects; and also attempts have been made to construct such handles from sheet metal, but the reinforcing means employed in such structures, and the methods of connecting the hub were complicated and expensive, and there was likelihood of the handle structure becoming loose.

It is an object of the present invention, therefore, to provide a sheet metal handle structure, of simple, inexpensive, and reliable construction, in which the handle body portion is in the form of a relatively heavy sheet metal shell, and within the respective ends of which are secured the operating spindle engaging hub and the hand grip, said hub and hand grip being fixedly secured in a manner to support, reinforce, and shape the sheet metal shell of the handle at its ends, the portion of the shell extending between said hub and hand grip being of such cross-sectional shape as to be self reinforcing, without the employment of additional reinforcing means, backing plates, fillers, or the like.

With the above and other objects in view, embodiments of the invention are shown in the accompanying drawings, and these embodiments will be hereinafter more fully described with reference thereto, and the invention will be finally pointed out in the claims.

In the drawings:—

Fig. 1 is a side elevation of a handle, according to one embodiment of the invention;

Fig. 2 is a top plan view thereof;

Fig. 3 is a bottom plan view of the same;

Fig. 4 is a side elevation of the sheet metal shell employed to form the main handle portion;

Fig. 5 is a side elevation of the hub member employed;

Fig. 6 is a longitudinal sectional view of the complete handle structure;

Fig. 7 is a sectional view, taken along the line 7—7 of Fig. 6;

Fig. 8 is a fragmentary sectional view of a handle structure, including a modified form of hub member;

Fig. 9 is a plan view of the hub member;

Fig. 10 is a side elevation of a handle, according to another modification of the invention;

Fig. 11 is a top plan view thereof;

Fig. 12 is a bottom plan view of the same;

Fig. 13 is a side elevation of the sheet metal shell employed to form the main handle portion;

Fig. 14 is a side elevation of the hub member employed;

Fig. 15 is a longitudinal sectional view of the complete handle structure;

Fig. 16 is a fragmentary sectional view of a handle structure, including a further modified form of hub member; and Fig. 17 is a plan view of the hub member.

Referring to the drawings, and more particularly to Figs. 1 to 7 thereof, the handle structure, according to the embodiment of the invention shown therein, comprises a main body portion 20 pressed from a single piece of sheet metal of relatively heavy gauge, provided at one end with an enlarged hub receiving portion 21, and at its other end with a hand-grip attaching portion 22, a flange 23 extending peripherally about the handle and forming a hollow shell-like structure, open at its inner side, said flange being slightly deeper about the hub receiving portion 21, as at 24, for the purpose of bending under to secure the hub member, as will presently more fully appear.

The hub receiving portion 21 is of non-circular form, hexagonal as shown, and is adapted to receive the inner flanged end portion 25 of the hub 26, said flanged end being of corresponding shape to the portion 21, and tightly fitted therein in a manner to be held against relative turning movement, and is secured by bending under the flange portion 24, as shown in Fig. 6, said flange when bent under being flush with the adjacent edge of the flange 23. The hub is adapted to be secured to the operating spindle 27, and for this purpose is provided with a square hole 28, in which the spindle is adapted to be engaged, and is further provided with radial holes 29 for securing the spindle by set-screws.

The inner end of the hole 28 is closed by the transverse portion of the part 21 of the handle, this part having any desired ornamental contour pressed therein, its plan outline, however, corresponding to that of the hub flange 25.

The end portion 22 is recessed at its under side, and has a hexagonal washer 30 tightly engaged therein. A hole 31 is formed in said portion 22 in registry with the hole of said washer, and a pin 32, supporting a rotatable bushing 33, is engaged in said holes and secured by heading over its lower end, as at 34. A sheet metal hand-grip 35 is secured by a force fit on the bushing 33, being rotatable with said bushing about the pin 32.

In Figs. 8 and 9 there is illustrated a modified form of the invention, in which the hub member is formed of one piece of sheet metal pressed to shape, and including a hexagonal flange portion 36 and a squared tubular spindle engaging portion 37, its assembly in the handle structure being substantially the same as in the first described form.

In Figs. 10 to 15 there is illustrated a further modification of the invention, in which the sheet metal body portion 38 is provided at one end with an enlarged hub receiving portion 39, and at its other end with a hand-grip attaching portion 40, a flange 41 extending peripherally about the handle, providing a hollow shell-like structure, open at its inner side. The hub engaging portion 39 is further provided with an inwardly off-set shouldered flange 42 of non-circular outline, a distended square in the present embodiment.

The hub comprises a plate 43 having an outline corresponding to that of the flange 42, and provided with a central square opening 44 and a peripheral under-cut recess 45. Upon the inner side of the plate there is secured, preferably by spot welding, a cup-shaped member 46, having a circular recess 47 in its transverse portion and a square opening 48 within said recess in line with the opening 44, said recess 47 adapted in the assembled relation to register with an opening 49 in the upper surface of the sheet metal handle. As shown in Fig. 15 the hub is engaged with the shouldered flange 42, the latter being bent into the peripheral recess 45 to secure the hub, the cup member 46 being disposed between the plate 43 and the upper wall of the handle, constituting a reinforcing and supporting structure therefor. The shouldered operating spindle 50 is engaged in the openings 44 and 48 of the plate and cup member, and is secured by a screw 51 having its head disposed in the opening 49 of the handle and seated in the recess 47 of said cup member.

The end portion 40 is recessed at its under side and has a washer 52 tightly engaged therein, a hole 53 being formed in said portion 40 in registry with the hole of the washer. A shouldered pin 54 is engaged through said holes and secured by heading over, as at 55, a sheet metal hand-grip member 56, having a recessed and apertured upper end 57, and having an apertured plate 58 secured in its lower end, being rotatably engaged on said pin and retained thereon by the headed end 59 of the pin engaged in flush relation within the recessed end 57.

In Figs. 16 and 17 there is illustrated a modified form of hub member, pressed from a single piece of sheet metal, and including a base portion 60 having a peripheral recess 61 pressed in its under surface, and a square upstanding tubular portion 62, adapted to receive the operating spindle 63, which latter is secured by a set screw 64. In the assembled relation, as shown, the portion 62 extends into contacting relation with the inner surface of the handle, and the hub is secured by bending the flange 42 into the recess 61, in a similar manner to the form shown in Figs. 10 to 15.

The improved structure, according to my invention, provides a strong, reliable, and attractive handle, and one which may be efficiently and economically manufactured from sheet metal. The hub assembly provides a rigid connection with the operating spindle and at the same time reinforces and shapes the sheet metal body, while the flanged arm portion extending between the hub and the hand-grip is so formed and related to the adjacent structure as to provide a structure of sufficient strength and rigidity to take care of any force that may be exerted thereon. In actual use the open inner side of the handle is concealed from view, and its skeleton form, therefore, in no way detracts from the appearance of the handle.

I have illustrated and described preferred and satisfactory embodiments of my invention, but it is obvious that changes may be made therein, within the spirit and scope thereof, as defined in the appended claims.

Having thus described my invention, what I claim and desire to secure by Letters Patent is:—

1. In a handle structure, a sheet metal body shell peripherally flanged and open at its inner side, including a hub receiving end portion, a hand-grip attaching end portion, and an arm portion extending between said end portions, a hub member engaged in said hub receiving portion, an inwardly bent retaining flange on said hub receiving portion adapted to retain said hub member, and hand-grip means secured to said hand-grip attaching portion.

2. In a handle structure, a sheet metal body shell peripherally flanged and open at its inner side, including a hub receiving end portion, a hand-grip end portion, and an arm portion extending between said end portions, and a hub member engaged and retained in said hub receiving portion.

3. In a handle structure, a sheet metal body shell peripherally flanged and open at its inner side, including a hub receiving end portion, a hand-grip attaching end portion, and an arm portion extending between said end portions, a hub member including a non-circular flange portion engaged in said hub receiving portion, said hub receiving portion corresponding in outline to said hub flange, an inwardly bent retaining flange on said hub receiving portion adapted to retain said hub member, and hand-grip means secured to said hand-grip attaching portion.

4. In a handle structure, a sheet metal body shell peripherally flanged and open at its inner side, including a hub receiving end portion, a hand-grip attaching end portion, and an arm portion extending between said end portions, a one-piece hub member including a non-circular flange portion engaged in said hub receiving portion and a tubular spindle receiving portion, said hub receiving portion corresponding in outline to said hub flange, an inwardly bent retaining flange on said hub receiving portion adapted to retain said hub member, and hand-grip means secured to said hand-grip attaching portion.

5. In a handle structure, a sheet metal body shell peripherally flanged and open at its inner side, including a hub receiving end portion, a hand-grip attaching end portion, and an arm portion extending between said end portions, a hub member including an inner non-circular flange portion engaged in said hub receiving portion and an outer tubular spindle receiving portion, said hub receiving portion corresponding in outline to said hub flange, an inwardly bent retaining flange on said hub receiving portion adapted to retain said hub member, and hand-grip means secured to said hand-grip attaching portion.

Signed at Bridgeport, in the county of Fairfield, and State of Connecticut, this 5th day of April, 1926.

RAYMOND G. MOORE.